(12) United States Patent
Wilcox et al.

(10) Patent No.: US 7,267,020 B2
(45) Date of Patent: Sep. 11, 2007

(54) APPARATUS FOR STRUCTURAL TESTING

(75) Inventors: David E. Wilcox, Gilbert, AZ (US); Timothy R. Duffy, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 144 days.

(21) Appl. No.: 11/217,145

(22) Filed: Aug. 31, 2005

(65) Prior Publication Data

US 2007/0044581 A1   Mar. 1, 2007

(51) Int. Cl.
*G01M 19/00* (2006.01)
*G01M 17/00* (2006.01)
*G01N 29/265* (2006.01)
*G01N 27/87* (2006.01)

(52) U.S. Cl. ............... 73/866.5; 73/618; 73/865.9; 324/222

(58) Field of Classification Search .... 73/865.8–865.9, 73/866.5, 618–626, 661, 663–668; 324/222
See application file for complete search history.

(56) References Cited

U.S. PATENT DOCUMENTS

| | | | | |
|---|---|---|---|---|
| 3,830,480 | A | * | 8/1974 | Grant ................. 73/866.5 X |
| 4,052,888 | A | * | 10/1977 | Brown et al. ............... 73/625 |
| 4,602,163 | A | | 7/1986 | Pryor |
| 5,081,800 | A | * | 1/1992 | Ruholl ....................... 451/2 |
| 5,111,402 | A | * | 5/1992 | Brooks et al. ............. 701/35 |
| 5,212,654 | A | * | 5/1993 | Deuar ....................... 702/43 |
| 5,257,088 | A | | 10/1993 | Tyson, II et al. |
| 5,350,033 | A | | 9/1994 | Kraft |
| 5,367,458 | A | | 11/1994 | Roberts et al. |
| 5,467,658 | A | * | 11/1995 | Buckalew et al. ......... 73/865.9 |
| 5,473,953 | A | | 12/1995 | Appel |
| 5,633,707 | A | | 5/1997 | Seemann |
| 5,666,202 | A | | 9/1997 | Kyrazis |
| 5,735,352 | A | | 4/1998 | Henderson et al. |
| 6,220,099 | B1 | | 4/2001 | Marti et al. |
| 6,378,387 | B1 | | 4/2002 | Froom |
| 6,496,755 | B2 | | 12/2002 | Wallach et al. |
| 6,636,581 | B2 | | 10/2003 | Sorenson |
| 6,667,592 | B2 | | 12/2003 | Jacobs et al. |
| 6,690,978 | B1 | | 2/2004 | Kirsch |
| 6,981,418 | B1 | * | 1/2006 | Mueller .................... 73/618 X |
| 2003/0033895 | A1 | * | 2/2003 | Kitamura .................. 73/865.8 |
| 2003/0048081 | A1 | | 3/2003 | Seemann |
| 2003/0089183 | A1 | | 5/2003 | Jacobsen et al. |
| 2004/0073411 | A1 | | 4/2004 | Alston et al. |
| 2005/0056105 | A1 | * | 3/2005 | Delacroix et al. ......... 73/865.8 |
| 2007/0006658 | A1 | * | 1/2007 | Kennedy et al. ............. 73/622 |

FOREIGN PATENT DOCUMENTS

| | | | |
|---|---|---|---|
| DE | 3524390 A1 | * | 1/1987 |
| DE | 3808473 C1 | * | 2/1989 |
| EP | 458053 A | * | 11/1991 |
| JP | 02071137 A | * | 3/1990 |

* cited by examiner

*Primary Examiner*—Thomas P. Noland
(74) *Attorney, Agent, or Firm*—Ingrassia Fisher & Lorenz

(57) ABSTRACT

An inspection device for performing nondestructive testing on a test subject includes a manually controlled inspection cart. The inspection device also includes a nondestructive testing platform and a computer coupled to the inspection cart. The computer is operable to control the movement of the nondestructive testing device when the inspection device is within a predetermined distance from the test subject.

19 Claims, 8 Drawing Sheets

APPARATUS FOR STRUCTURAL TESTING

TECHNICAL FIELD OF THE INVENTION

This invention relates to the field of structural testing and, more specifically, to an apparatus for structural testing.

BACKGROUND OF THE INVENTION

The periodic, nondestructive testing of large structures, such as large passenger vehicles, is important to assist in the evaluation of structural integrity. For example, aircraft undergo nondestructive testing in order to detect structural variations or changes such as structural fatigue. An example of a aircraft component that is periodically inspected for structural changes or variations is the outer surface of the fuselage. However, the size of the fuselage makes nondestructive testing a difficult undertaking.

One approach used for nondestructive testing of an aircraft fuselage and other large structures involves a trained operator performing tests with portable equipment. This approach has a number of drawbacks including that it is a slow process and requires a specially trained individual. Another approach used for the nondestructive testing of large structures utilizes a robotic vehicle. The robotic vehicle automatically maneuvers itself to the test subject and performs nondestructive testing at various points on the test subject. However, this degree of automation results in high costs and complex systems. Additionally, the proper mounting and alignment of testing devices is difficult.

In view of the foregoing, it is desirable to provide an apparatus for structural testing that addresses one or more of the foregoing deficiencies or other deficiencies not implicitly or expressly described. Furthermore, other desirable factors and characteristics of the present invention will become apparent from the subsequent detailed description and the appended claims, taken in conjunction with the accompanying drawings and the foregoing technical field and background.

SUMMARY OF THE INVENTION

In one embodiment of the invention, an inspection device for performing nondestructive testing on a test subject includes a manually controlled inspection cart. The inspection device also includes a nondestructive testing platform and a computer coupled to the inspection cart. The computer is operable to control the movement of the nondestructive testing device when the inspection device is within a predetermined distance from the test subject.

In another embodiment, a nondestructive testing platform comprises a manually operated inspection cart. The testing platform further comprises a vertical tower mounted on the inspection cart and a boom mounted on the vertical tower. The boom is operable to move vertically along the vertical tower; and a nondestructive testing device mounted on to the boom.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures:

DETAILED DESCRIPTION OF THE DRAWINGS

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Figure 1:
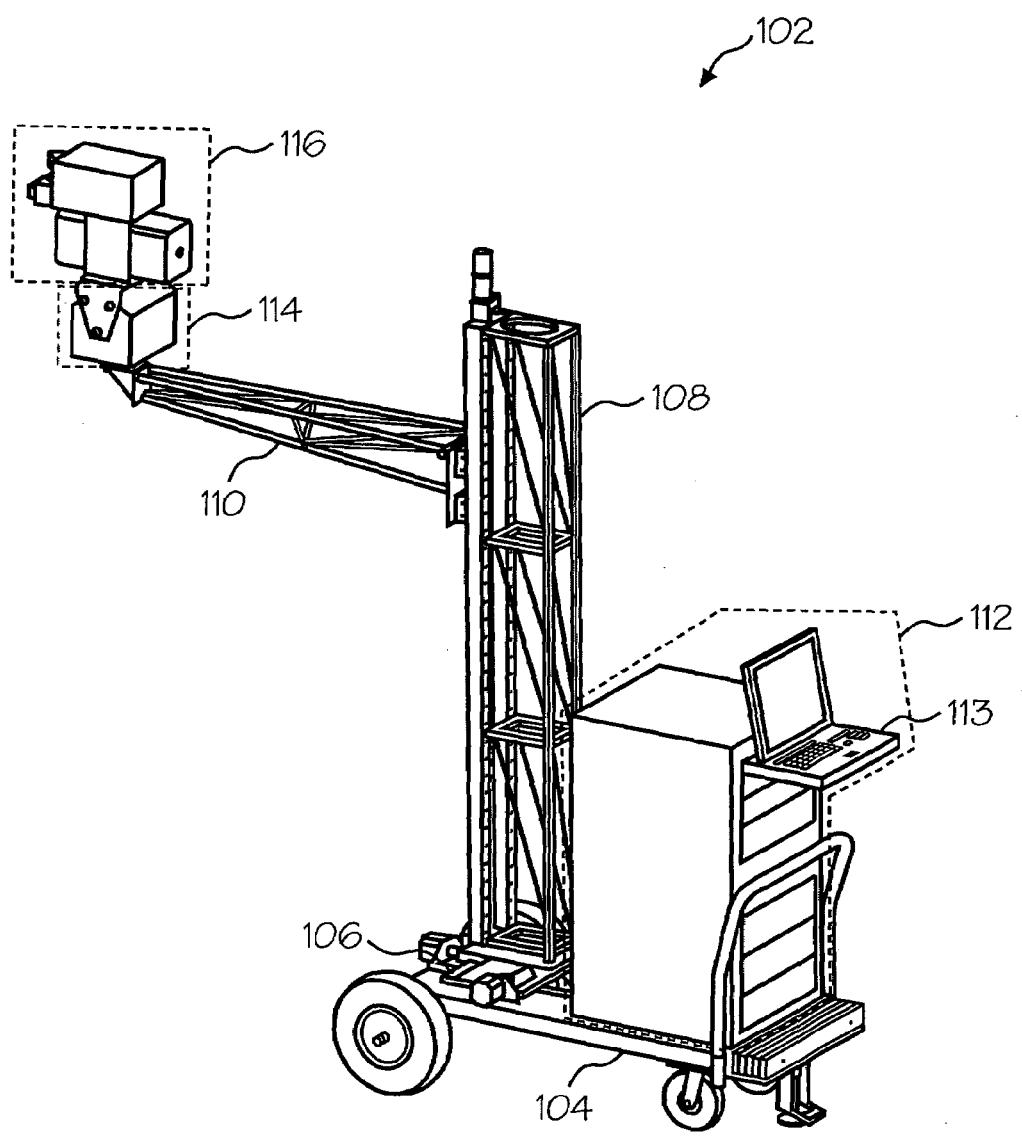
FIG. 1 illustrates an exemplary embodiment of an inspection station in accordance with the teachings of the present invention.
Figure 2:
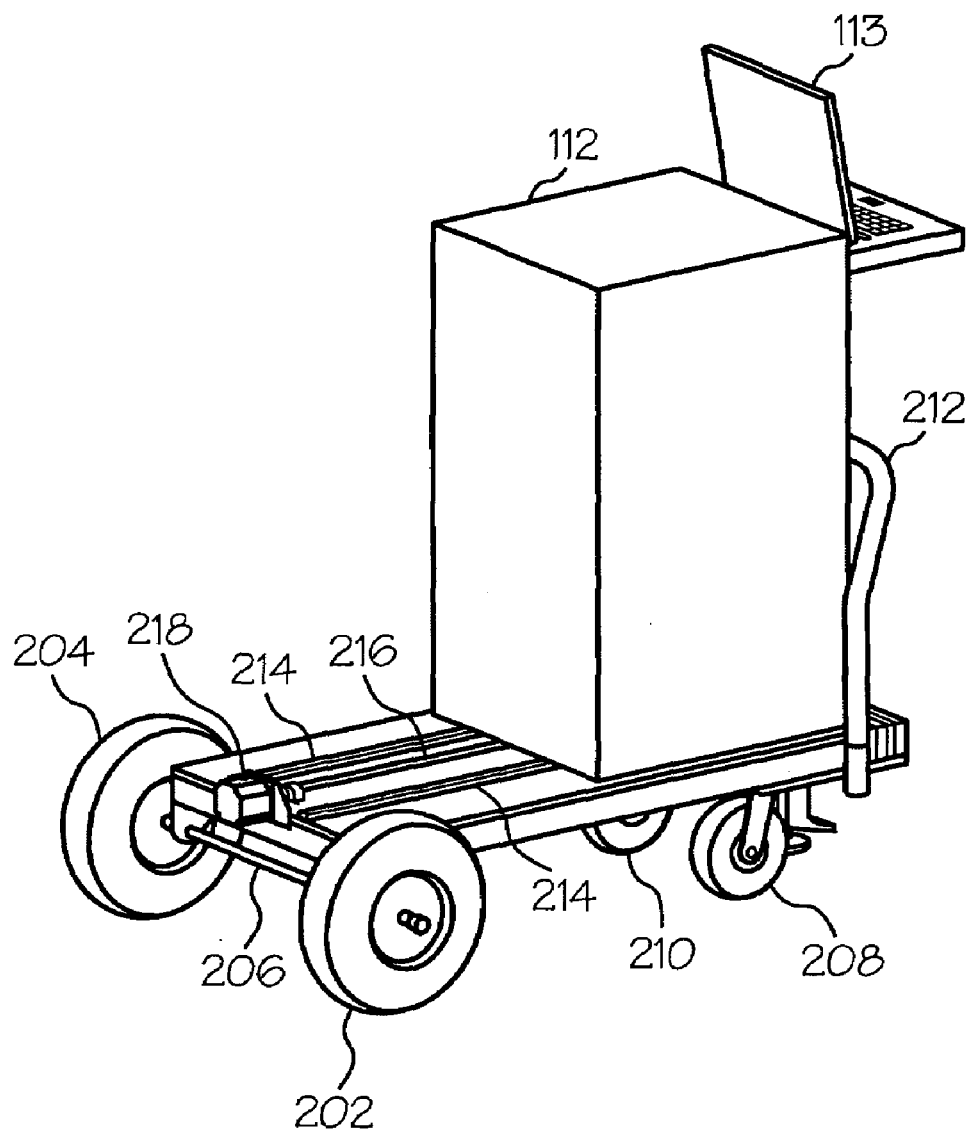
FIG. 2 illustrates an exemplary embodiment of a cart in accordance with the teachings of the present invention.

FIG. 1 illustrates an exemplary embodiment of the present invention. As seen in FIG. 1, an inspection station 102 comprises a cart 104, a sliding table 106, a vertical tower 108, a boom 110, an electronic rack 112, a pan-tilt head 114, and nondestructive test device 116. Cart 104 allows the inspection station 102 to move from one location to another. As seen in FIG. 2, cart 104 includes two front wheels 202 and 204 coupled by a front axis 206 and two rear wheels 208 and 210. In one exemplary embodiment, one or more of the wheels can swivel to allow for movement of the cart 104. A handle section 212 provides an area for the operator to grasp when maneuvering the inspection station. The electronic rack 112 can be mounted on the cart section 104.

The electronic rack 112 can include controls for operating the nondestructive test device and the moving components of the inspection station 102. The electronic rack 112 can also include a computer 113, such as a laptop computer, that is operable to provide automatic control of the nondestructive testing operation, as well as to collect generated data. For example, the computer 113 can control the movement of various motors and other equipment to adjust the positioning of the nondestructive test device 116. The computer 113 can also provide information as to the relative location of the inspection station 102.

Figure 3:
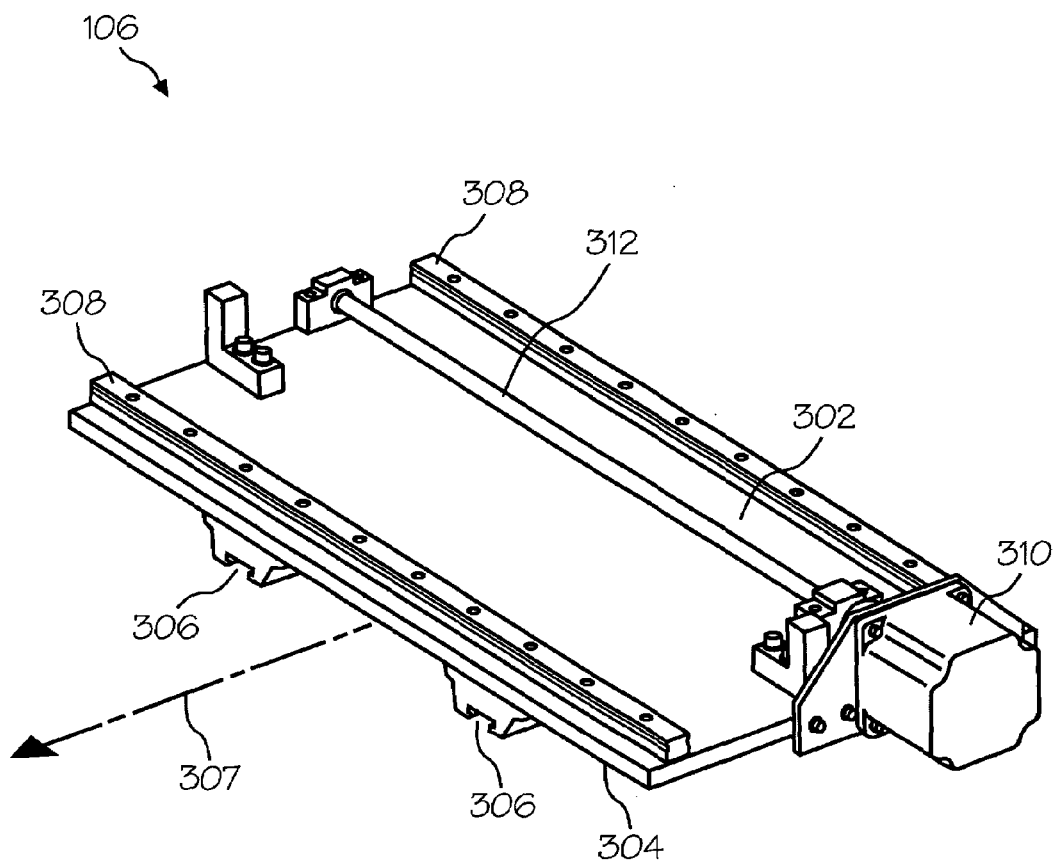
FIG. 3 illustrates an exemplary embodiment of a sliding table in accordance with the teachings of the present invention.

Sliding table 106, illustrated in detail in FIG. 3, provides two degrees of freedom for the inspection station 102. The sliding table 106 allows for movement of the vertical tower 108 (and therefore, the components connected to the vertical tower 108) in two directions; one direction along an imaginary line 307 bisecting the axis of the front wheels and another direction perpendicular to the first direction. In an exemplary embodiment, sliding table 106 has a top side 302 and a bottom side 304. Bottom side 304 includes a pair of x-axis bearings 306, and an x-axis nut drive (not shown). The top side 302 includes y-linear guides 308, a y-drive motor 310, and a y-lead screw 312.

Figure 4:
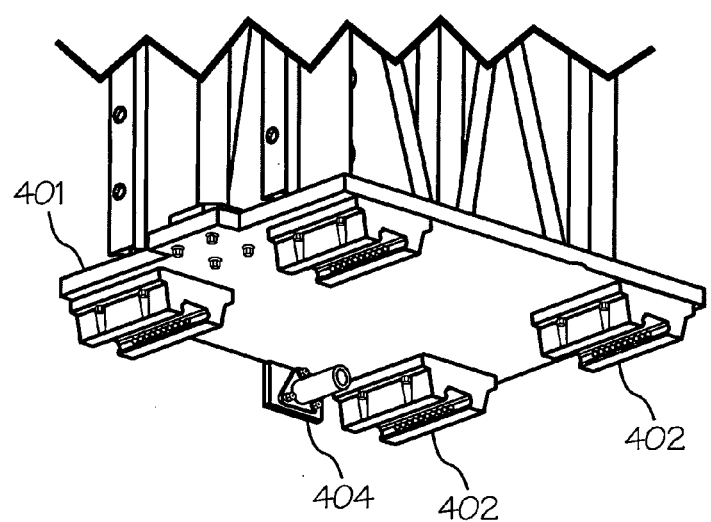
FIG. 4 illustrates an exemplary embodiment of a base of a vertical tower in accordance with the teachings of the present invention.

Referring to FIGS. 2 and 3, X-axis bearings 306 engage x-linear guides 214 mounted on to cart section 104 to allow sliding table 106 to move in a direction along the line 307. The x-axis drive nut (not shown) couples to an x-axis lead screw 216 to allow for movement along the x-linear guide using, in an exemplary embodiment, a stepper motor 218. Other methods of moving the sliding table 106 are available. Y-linear guides 308 engage y-bearings 402 mounted on the base 401 of the vertical tower 108 for movement of the vertical tower 108 perpendicular to the x-axis movement as shown in FIG. 4. The y-lead screw 312 that is powered by the y-drive motor 310 couples to the y-drive nut 404 to move the vertical tower 108. The sliding table 106, in one exemplary embodiment, provides movement to adjust the nondestructive test device 116 when the inspection station 102 is near the test subject, as will be discussed in detail below. In one exemplary embodiment, sliding table 106 can move approximately 5 inches forward along the line 307 and the vertical tower 108 can move approximately five inches back and forth along the y-linear guides 308.

Figure 5:
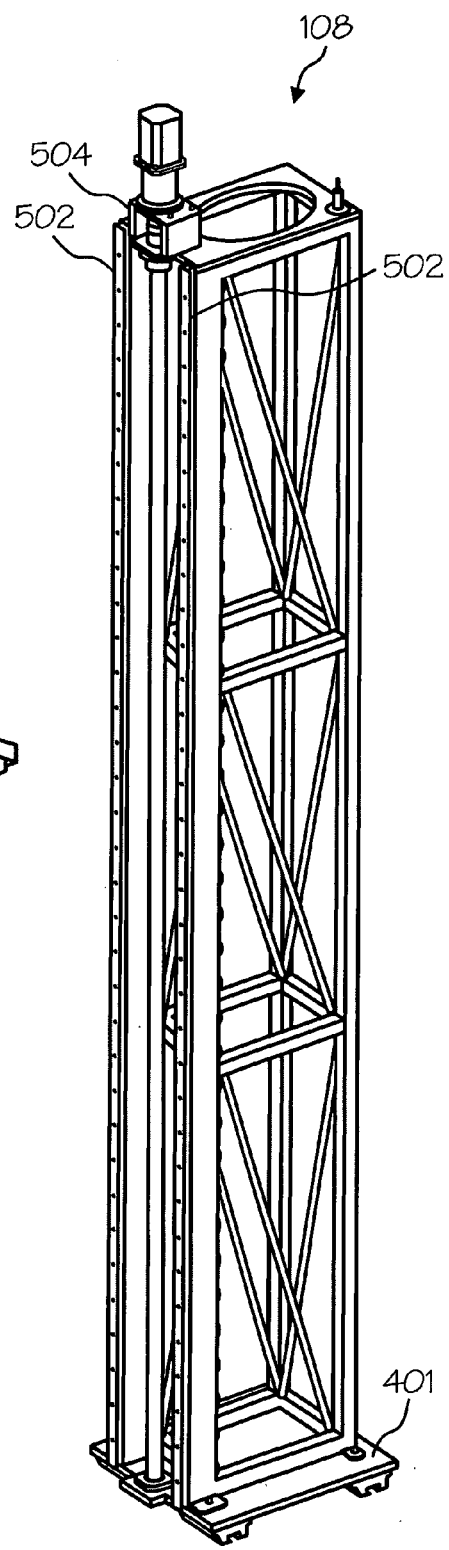
FIG. 5 illustrates an exemplary embodiment of a vertical tower in accordance with the teachings of the present invention.

Vertical tower 108 supports boom 110 and allows for the boom 110 to move up and down to adjust the position of the nondestructive test device 116, thereby providing one degree of freedom to the inspection station 104. As seen in FIG. 5, vertical tower 108 has two vertically mounted rails 502 upon which the boom 110 can travel. In one exemplary embodiment, vertical tower 108 also includes a drive system 504 for powering the movement of the boom 110, although other methods of moving the boom 110 can also be used. Vertical tower 108 can be sized to match the size of the test subject and can include multiple vertical sections.

Figure 6:
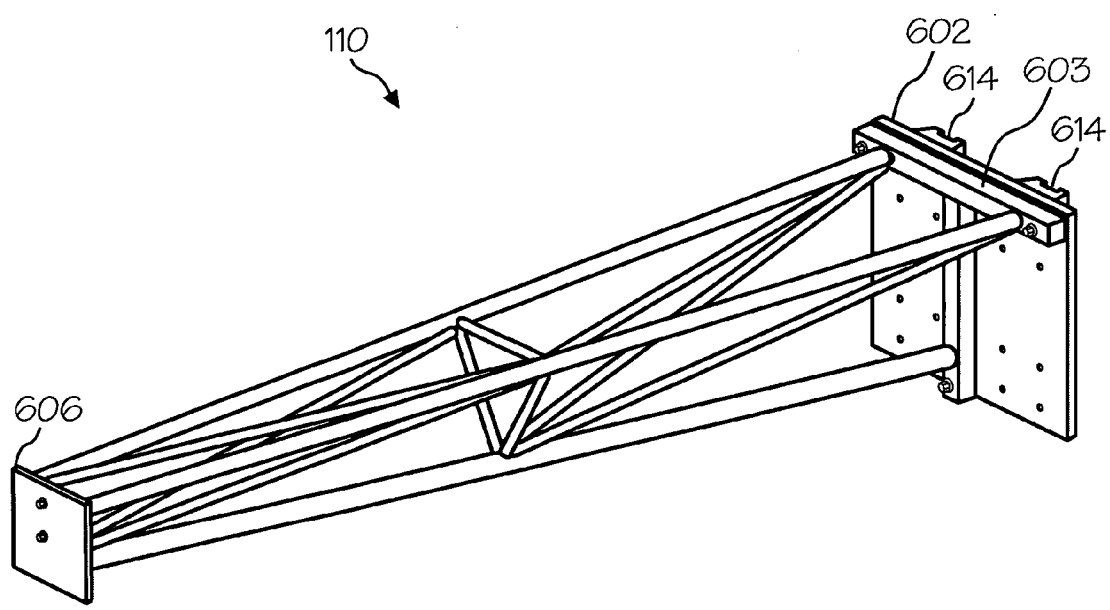
FIG. 6 illustrates an exemplary embodiment of a boom in accordance with the teachings of the present invention.

Turning to FIG. 6, boom 110 couples to the vertical tower 108 at a first end 602 of the vertical tower 108 such that the boom 110 is essentially perpendicular to and extends out from the vertical tower 108. Boom 110 provides support for the pan-tilt head 114. In one exemplary embodiment, the first end 602 includes a bottom 603 having bearings 614 that allow for movement up and down the two vertically mounted rails 502 of vertical tower 108. Boom 110 also includes a mounting surface 606 upon which the pan-tilt head 114 can be attached.

Figure 7:
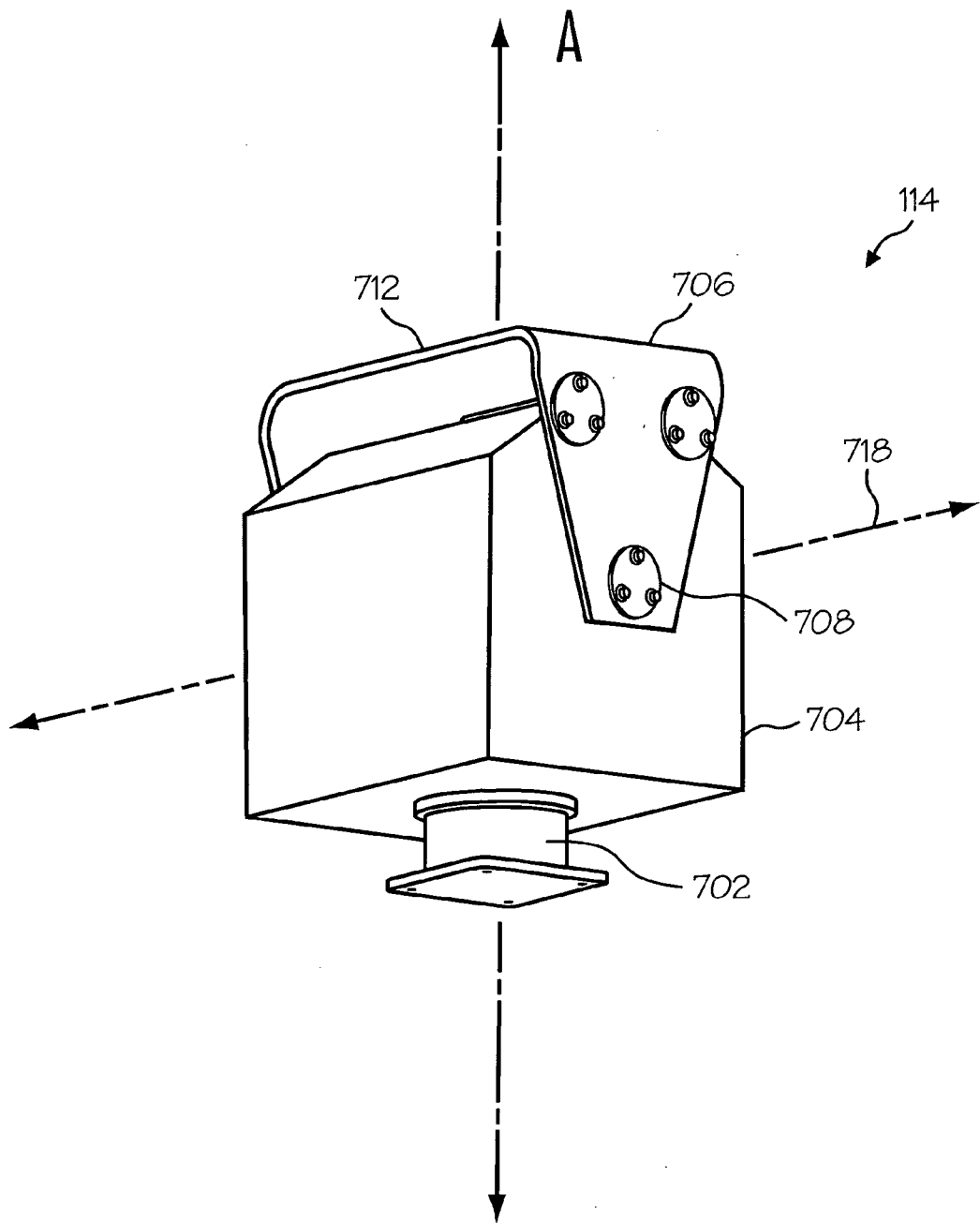
FIG. 7 illustrates an exemplary embodiment of a pan-tilt adjuster in accordance with the teachings of the present invention.

Turning to FIG. 7, pan-tilt head 114 couples to the mounting surface 606 of the boom 110 and provides two degrees of freedom. In an exemplary embodiment, pan-tilt head 114 includes a pan bearing 702 that couples at one end of to the mounting surface 606 and the other end to a pan body 704. A tilt bracket 706 couples at a first portion 708 to the pan body 704. The pan bearing 702 allows the pan body 704 to rotate about axis A. The tilt bracket 706 includes a mounting surface 712 for mounting nondestructive test device 116. Mounting surface 712 preferably pivots about tilt axis 718.

Figure 8:
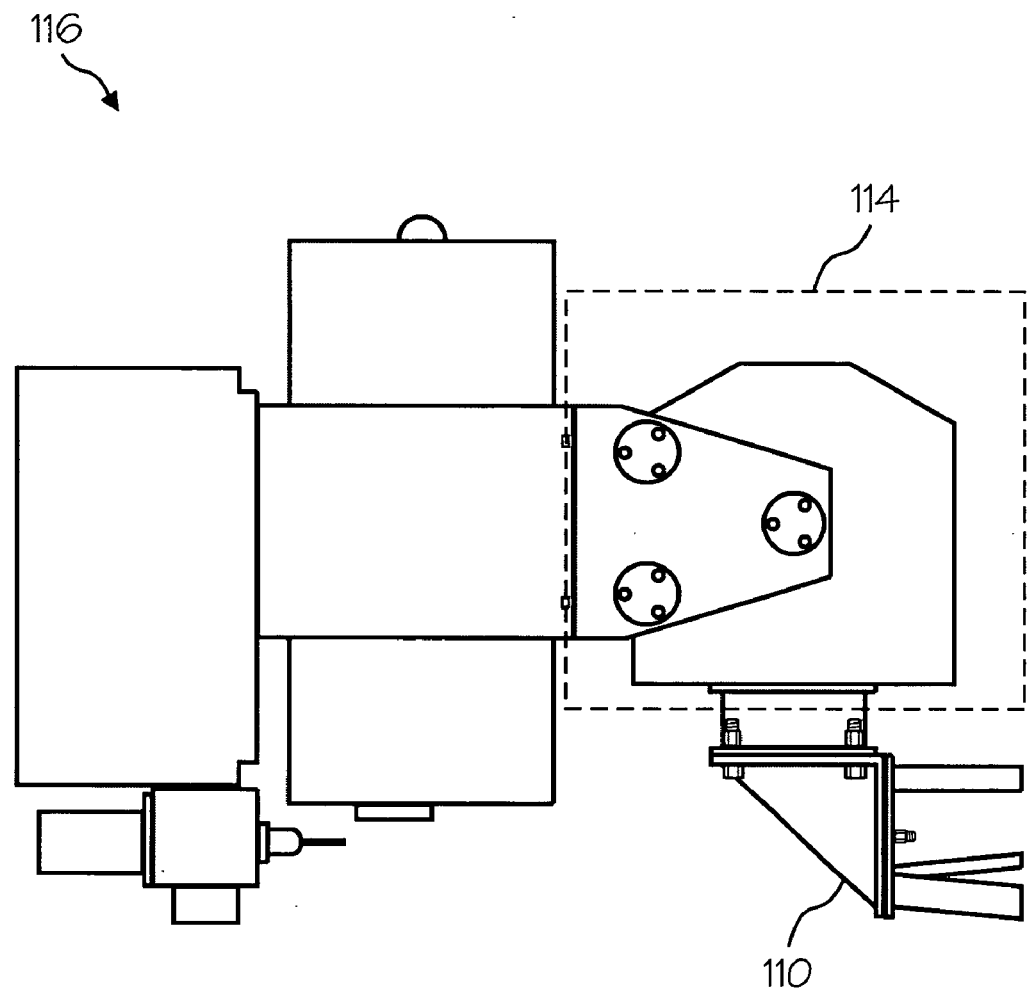
FIG. 8 illustrates an exemplary embodiment of a nondestructive testing package in accordance with the teachings of the present invention.

In FIG. 8, the nondestructive test device 116 is coupled to pan-tilt head 114. The nondestructive test device 116 can be any one of a number of testing devices such as an inspection camera for visual inspection of a surface, a vibrometer for performing vibration analysis testing, an eddy current tester, an ultrasonic tester, and the like. However other nondestructive testing devices can be used in accordance with the present invention. In one embodiment, the nondestructive test device 116 can perform other maintenance functions. For example, the nondestructive test device can be a painting device for painting the test structure, a cleaning device for cleaning the test subject, a de-icing device for removing ice from the test subject, or any other tool that requires the device to be moved to different areas of the aircraft.

In an exemplary embodiment of the present invention, a user maneuvers the inspection station 102 proximate to where the testing will take place. For example, the user can maneuver the inspection station 102 up to an aircraft and stop at a predetermined location. The inspection station 102 can then, either through manual control or automatic control, be maneuvered to place the nondestructive test device 116 to the proper location and alignment to use the nondestructive test device and the nondestructive test. In the exemplary embodiment, where the nondestructive test device 116 is manually maneuvered to a test position, the user can determine the place to position the nondestructive test device 116 based on either what the users can see directly or through the use of a visual guide such as a camera.

Figure 9:
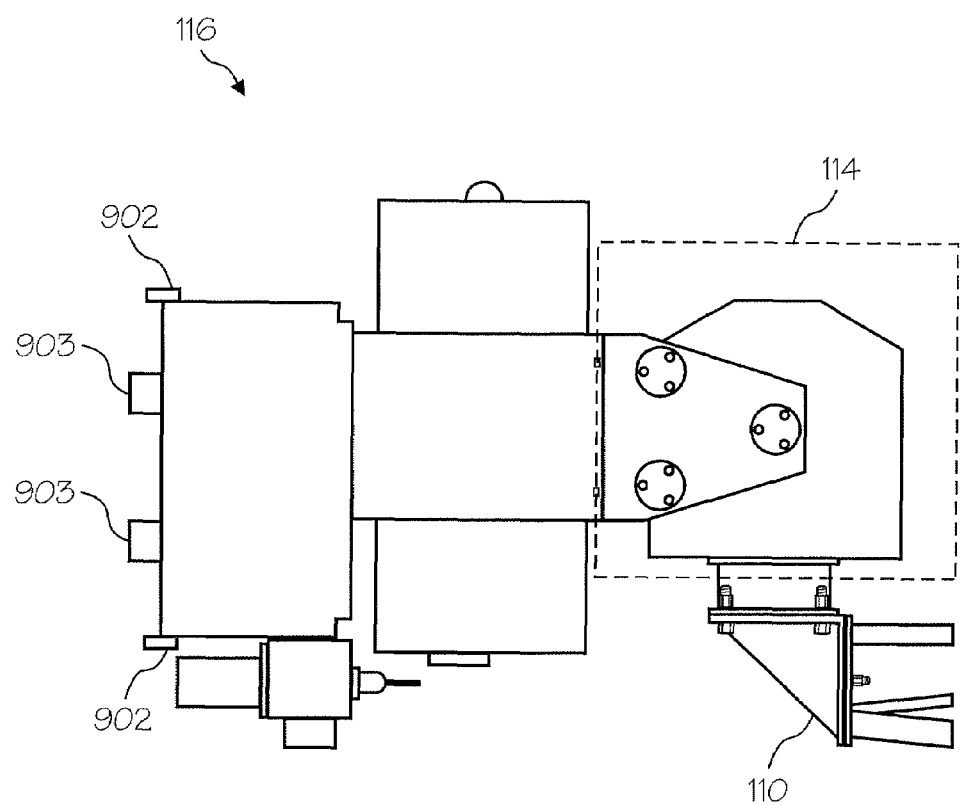
FIG. 9 illustrates an exemplary use of the inspection station in accordance with the teachings of the present invention.

FIG. 9 illustrates the nondestructive test device 116 with the addition of distance sensors 902. Distance sensors 902 indicate how far the sensors are from a target, such as the test subject. By mounting the distance sensors 902 on the nondestructive test device 116, the distance sensors 902 can provide feedback as to the distance between nondestructive test device 116 and the test subject. This information can be used to assist an operator in positioning the inspection station 102. Once in a desired position, the distance sensors 902 can provide data to the computer 113 in order to move the vertical tower 108, the boom 110, and pan-tilt head 114 to set the nondestructive test device 116 to the proper distance for testing. The distance sensors 902 can be ultrasonic distance sensors, optical distance sensors, laser distance sensors, and the like. By first manually positioning the inspection station 102 and then aligning the nondestructive test device 116, the potential is reduced for striking the test subject with the inspection station. Alternatively, the distance sensors 902 can provide feedback to the operator in order to manually position the test device.

Additionally, pressure sensors 903 can be used to provide information as to how much force is contacting the test subject in situation where the nondestructive testing device touches the surface of the test subject. For example, ultrasonic testers typically require contact with the test subject.

The example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. An inspection device for performing nondestructive testing on a test subject comprising:
   a manually controlled inspection cart;
   a tower coupled to the inspection cart, a sliding table coupled between the inspection cart and the tower, the sliding table allowing the vertical tower to move in two degrees of freedom; and
   a nondestructive testing device coupled to the tower, the nondestructive testing device operable to move up and down along the tower.

2. The inspection device of claim 1 further comprising:
   a computer coupled to the inspection cart, the computer operable to control the movement of the nondestructive testing device when the inspection device is within a predetermined distance from the test subject.

3. The inspection device of claim 1 further comprising a boom coupled at a first end to the tower and at a second end to the nondestructive testing device, the boom operable to move up and down along the tower.

4. The inspection device of claim 3 further comprising a pan and tilt body coupled between the boom and the nondestructive testing device, the pan and tilt body providing two degrees of freedom of movement.

5. The inspection device of claim 4 further comprising distance sensors coupled top the nondestructive testing device, the distance sensors providing an indication as to how close the inspection device is to the test subject.

6. The inspection device of claim 5 wherein the nondestructive testing device is placed in alignment with the test subject by movement of the vertical tower, the boom and the pan and tilt body, the movement determined, by at least in part, the distance sensors.

7. The inspection device of claim 3 further comprising pressure sensors coupled to the nondestructive testing device, the pressure sensors providing an indication as to the contact force of the sensor to the test subject.

8. The inspection device of claim 1 wherein the nondestructive testing device is a device selected from the group consisting of vibrometers, ultrasonic inspecting devices, and eddy current inspection devices.

9. The inspection device of claim 1 wherein the test subject is an aerospace vehicle.

10. The inspection device of claim 1 wherein the nondestructive testing device is operable to perform other maintenance functions.

11. A nondestructive testing platform comprising:
a manually operated inspection cart;
a vertical tower mounted on the inspection cart;
a sliding table between the inspection cart and the tower, the sliding table allowing the tower to move in two degrees of freedom;
a boom mounted on the tower, the boom operable to move vertically along the vertical tower; and
a nondestructive testing device mounted on to the boom.

12. The nondestructive testing platform of claim 11 further comprising a pan and tilt body coupled between the boom and the nondestructive testing device.

13. The nondestructive testing platform of claim 12 further comprising distance sensors that provide an indication as to how close the platform is to a test subject.

14. The nondestructive testing platform of claim 13 wherein the test subject is an aircraft.

15. The nondestructive testing platform of claim 13 wherein the nondestructive testing device is placed in alignment with the test subject by movement of the vertical tower, the boom, and the pan and tilt body, the movement determined, by at least in part, the distance sensors.

16. The inspection device of claim 11 further comprising distance sensors coupled to the nondestructive testing device, the distance sensors providing an indication as to how close the testing device is to a test subject.

17. The nondestructive testing platform of claim 11 wherein the inspection cart further comprises a computer to control the nondestructive testing device.

18. The nondestructive testing platform of claim 11 wherein the nondestructive testing device is a device selected from the group consisting of vibrometers, ultrasonic inspecting devices, and eddy current inspection devices.

19. The inspection device of claim 11 wherein the nondestructive testing device is operable to perform other maintenance functions.

* * * * *